Nov. 1, 1932. P. M. ORLOPP 1,885,757
MEANS AND METHOD FOR MIXING PLASTIC OR FLUID SUBSTANCES
Filed March 27, 1928

Piatt M. Orlopp
INVENTOR

BY Victor J. Evans
ATTORNEY

Patented Nov. 1, 1932

1,885,757

UNITED STATES PATENT OFFICE

PIATT M. ORLOPP, OF CHICAGO, ILLINOIS

MEANS AND METHOD FOR MIXING PLASTIC OR FLUID SUBSTANCES

Application filed March 27, 1928. Serial No. 265,067.

This invention relates to certain novel improvements in a means and method for mixing plastic or fluid substances and has for its principal object the provision of an improved construction of this character which will be highly efficient in use and economical in manufacture.

Another object of my invention is to provide a suitable container in which a material may be housed and I contemplate arranging this container such that it will be substantially air tight and moisture proof.

Another object of the invention is to provide a container in which a removable top is provided and I arrange the container such that this top may be mounted at a point spaced from the upper edges of said container and I preferably arrange this top so as to embody a portion which may be punctured or broken at predetermined times.

An object of the invention, ancillary to the foregoing is to arrange the container such that water or the like may be mounted on the upper side of the removable lid and I arrange the device such that the water or the like will be caused to flow into the container in engagement with the material therein when the above named portion is punctured and I preferably arrange the container such that I may thoroughly mix the water and the material prior to its being dumped from the container.

A still further object of the invention is to arrange the container such that it will house predetermined amounts of water and material such that a definite intermixture thereof may be obtained so as to produce a product of uniform quality and characteristics.

Other objects will appear hereinafter.

The invention consists in the novel combination and arrangement of parts to be hereinafter described and claimed.

The invention will be best understood by reference to the accompanying drawing, showing the preferred form of construction and in which.

Figure 2:
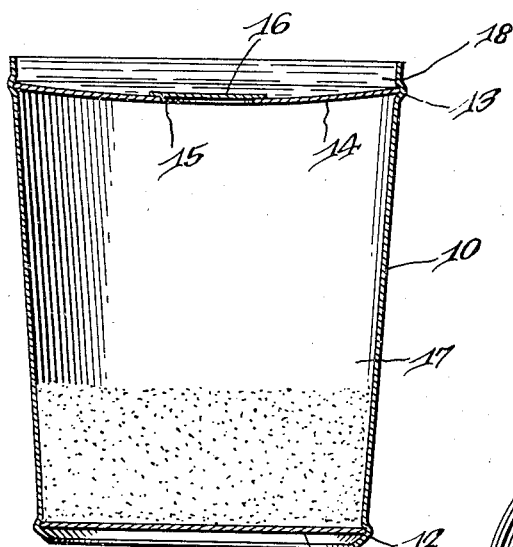
Fig. 2 is a sectional view taken substantially on the line 2—2 on Fig. 1.
Figure 1:
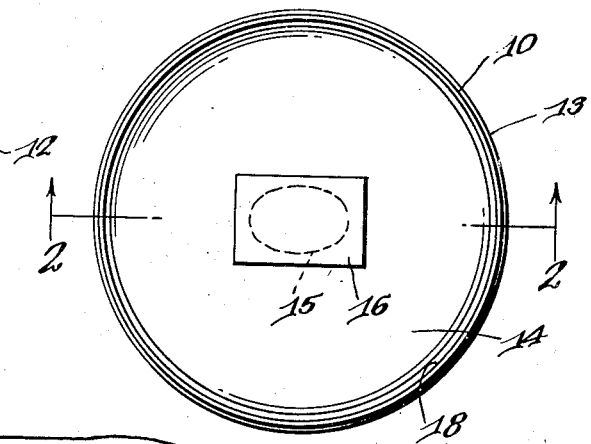
Fig. 1 is a top plan view of a container constructed in accordance with my invention.

In the drawing, wherein a preferred embodiment of my invention is illustrated, 10 indicates a substantially cylindrical member which is preferably composed of suitably treated paper so as to be substantially moisture-proof. At one end of the container, 10, a bottom 11 is secured as by crimping the edge of the member 10 as indicated at 12.

In spaced relation to the upper edge of the cylindrical member 10 I preferably form a crimped or rolled portion 13 which is adapted to receive and retain a removable lid 14. Inasmuch as the container 10 is crimped to retain the lid 14 and the bottom 11 in position the portion enclosed by the cylindrical member and these members will be substantially air tight and moisture proof.

As has been stated, the crimped portion 13 is disposed in spaced relation to the upper edge of the cylindrical member 10 and obviously the lid 14 will also be disposed in spaced relation thereto. I have found it preferable, though not necessary, to form this lid so as to be convex toward the bottom 11 and thus the upper side thereof is concave. At the lower-most portion of this concave lid I provide an opening 15 which is normally closed by a suitable strip of material 16 which may be adhesively secured thereto or which may be secured in any other desired manner. This strip 16 is adapted to be of a material such that it may be readily broken or punctured when so desired.

I introduce into the portion enclosed by the lid 15 and the end 11 and the cylindrical member 10, which will be called hereinafter the container 17, a material which is adapted to be mixed with water or other liquid and this material may be, for example, so called plaster of Paris. It is to be understood that a definite predetermined amount of this material is introduced into the container 17. When it is desired to use this material, water or other liquid is introduced onto the lid 14 and this space is adapted to be filled up to the edges of the member 10. The lid 14 is disposed in spaced relation to the edges of the member 10 such that the correct amount of liquid will be held thereabove for the quantity of material in the container 17. It is to be understood that this liquid may be introduced into the space above the lid 14, which will be called a chamber 18 hereinafter, at any desired time but when it is desired to intermix the materials, the member 16 is punctured which permits the water or other liquid to flow into the container 17.

Figure 3:
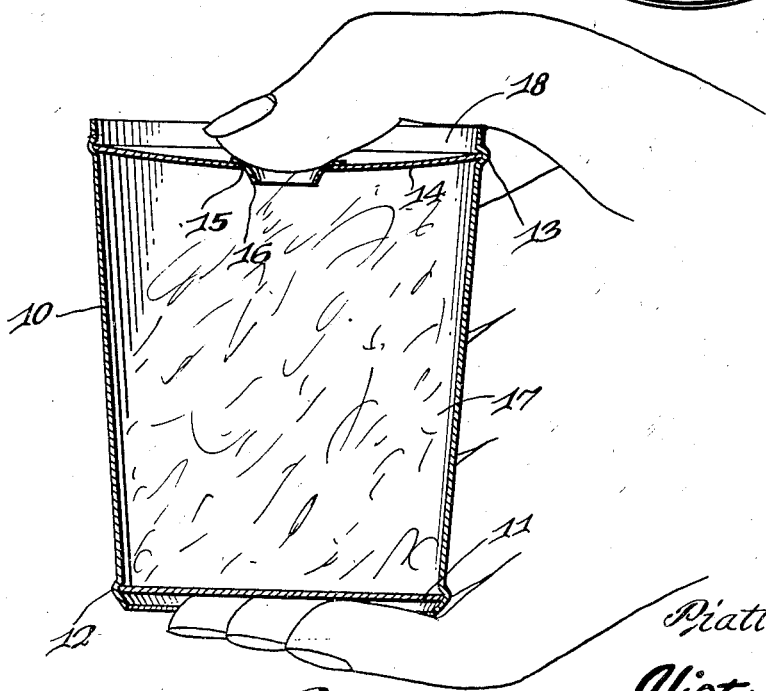
Fig. 3 is a view substantially similar to Fig. 2 depicting the container in position during the mixing operation.

My improved method of mixing the material and water consists in gripping the container 17 substantially in the manner illustrated in Fig. 3 so that the punctured member 16 will be closed by the thumb or finger of the user. By rapidly moving the container back and forth, the material and liquid will be intermixed and inasmuch as air will be prevented from entering the container 17 during this mixing operation and inasmuch as predetermined and definite amounts of material and liquid are being intermixed, it is apparent that a product of uniform quality and characteristics will result.

Since the material will be introduced into the container prior to its distribution and inasmuch as the chamber 18 will be arranged so as to contain the proper amount of liquid and inasmuch as the containers are all of the same size and therefore contain an equal amount of air, it is apparent that a novice may intermix these materials and produce a product of uniform result.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A container having a bottom wall, a lid for said container disposed in spaced relation to the upper edge of said container a predetermined distance, said lid having an opening formed therein, and a relatively thin breakable member adapted to close said opening, said container enclosing material for admixture with liquid, and the section of the container above the lid adapted when full to hold a proper proportionate amount of liquid for admixture with the amount of material enclosed in the container.

2. A container having an open upper end, a lid adapted to close said open end, said lid being adapted with the upper extension of the walls of said container to hold a quantity of liquid for mixture with the contents of said container, said lid having an opening formed therein, said container being adapted to house a predetermined quantity of material, said lid being disposed in spaced relation to the upper edge of said container a distance such that a space will be defined by said lid and the upwardly extending portions of the walls of the container of a volume proportionate to the quantity of material in said container.

3. A container having an open upper end, a lid for said open end, said container being adapted to house a predetermined quantity of a material, said lid being disposed in spaced relation to the upper edge of said container a distance such that a space will be defined by said lid and the walls of said container, said space embodying a volume adapted to contain a quantity of liquid which will be directly proportionate to the quantity of material in said container, said lid having an opening formed therein, and relatively thin breakable member adapted to close said opening, said member being adapted to be broken to permit said liquid to flow into said container whereby it will intermingle with the material therein.

4. A container having an open upper end a crimped portion in the walls of said container in spaced relation to the upper edges thereof, a substantially concavo-convex lid mounted so as to be retained by said crimped portions and adapted to close said open end and arranged with the concave portion thereof disposed to extend upwardly, said lid and the upwardly extending portion of the walls defining a compartment of a predetermined volume, said lid having an opening formed therein at the lower-most point thereof, and a relatively thin breakable member adapted to close said opening.

5. A plaster merchandising and mixing package comprising a container having a sealing closure and containing a measured quantity of plaster, the container and closure being of paper material, said container having an extension of the body thereof beyond said closure providing a receptacle of a volumetric capacity to hold the proper proportionate amount of liquid for admixture with such measured quantity of plaster to form a plastic composition of predetermined consistency, the said container being of a considerably greater internal volume than the combined volumes of said plaster and liquid, and the said closure embodying a disruptible portion by which an opening can be provided for discharge of such liquid into the container and which opening can be closed with the thumb after such discharge, whereby the container held in a person's hand with the thumb closing said opening can be used as a shaker to effect a thorough mixing of said plaster and liquid.

In testimony whereof I affix my signature.

PIATT M. ORLOPP.